(12) United States Patent
Khrushchev

(10) Patent No.: US 9,904,161 B2
(45) Date of Patent: Feb. 27, 2018

(54) LIGHTING DEVICE FOR GENERATING LIGHT BY MEANS OF WAVELENGTH CONVERSION

(71) Applicant: OSRAM GmbH, Munich (DE)

(72) Inventor: Sergey Khrushchev, Regensburg (DE)

(73) Assignee: OSRAM GmbH, Munich (DE)

( * ) Notice: Subject to any disclaimer, the term of this patent is extended or adjusted under 35 U.S.C. 154(b) by 33 days.

(21) Appl. No.: 14/526,555

(22) Filed: Oct. 29, 2014

(65) Prior Publication Data

US 2015/0153022 A1 Jun. 4, 2015

(30) Foreign Application Priority Data

Dec. 2, 2013 (DE) .................. 10 2013 224 691

(51) Int. Cl.
*F21V 13/00* (2006.01)
*G03B 21/28* (2006.01)
(Continued)

(52) U.S. Cl.
CPC .............. *G03B 21/28* (2013.01); *F21K 9/64* (2016.08); *G03B 21/204* (2013.01);
(Continued)

(58) Field of Classification Search
CPC .. G03B 21/28; G03B 21/204; G03B 21/2066; F21V 13/00; G02B 26/008
(Continued)

(56) References Cited

U.S. PATENT DOCUMENTS

2005/0225862 A1* 10/2005 Tang .................... G02B 5/0226
359/599
2005/0270775 A1 12/2005 Harbers et al.
(Continued)

FOREIGN PATENT DOCUMENTS

DE 102010001942 A1 8/2011
DE 102010001945 A1 8/2011
(Continued)

OTHER PUBLICATIONS

Search Report dated Feb. 5, 2014 in the German priority application No. 10 2013 224 691.9.

*Primary Examiner* — Christina Riddle
*Assistant Examiner* — Christopher Lamb, II
(74) *Attorney, Agent, or Firm* — Viering, Jentschura & Partner mbB

(57) ABSTRACT

A lighting device includes at least one excitation radiation source designed to emit excitation radiation; a wavelength conversion arrangement, which is arranged in such a way that excitation radiation can be radiated onto a wavelength conversion element. The wavelength conversion element is designed to convert excitation radiation into conversion light. An unavoidable non-converted part of the excitation radiation is reflected by the wavelength conversion element. The device further includes a unit for collimating the excitation radiation to form at least one collimated excitation beam; a unit for directing the at least one collimated excitation beam onto the at least one wavelength conversion element; a unit, which is arranged between collimation optical unit and converging optical unit and has at least one region for reflecting that part of the at least one excitation beam which is not converted, but rather is reflected by the at least one wavelength conversion element.

17 Claims, 3 Drawing Sheets

(51) Int. Cl.
*G03B 21/20* (2006.01)
*F21K 9/64* (2016.01)
*F21Y 115/30* (2016.01)
*F21Y 115/10* (2016.01)

(52) U.S. Cl.
CPC ........ *F21Y 2115/10* (2016.08); *F21Y 2115/30* (2016.08); *G03B 21/2066* (2013.01)

(58) Field of Classification Search
USPC .......................................................... 362/84
See application file for complete search history.

(56) References Cited

U.S. PATENT DOCUMENTS

| | | | | |
|---|---|---|---|---|
| 2010/0328617 | A1* | 12/2010 | Masuda | G03B 21/14 353/31 |
| 2011/0310363 | A1* | 12/2011 | Kita | G03B 21/204 353/98 |
| 2012/0127435 | A1* | 5/2012 | Kitano | G03B 21/204 353/20 |
| 2012/0316397 | A1* | 12/2012 | Berben | A61B 18/22 600/182 |
| 2013/0050981 | A1* | 2/2013 | Yang | G03B 21/204 362/84 |
| 2014/0160441 | A1* | 6/2014 | Kim | G03B 21/204 353/33 |
| 2014/0218623 | A1* | 8/2014 | Kimura | H04N 9/3111 348/744 |
| 2014/0254129 | A1* | 9/2014 | Miyoshi | F21V 13/08 362/84 |
| 2014/0285774 | A1* | 9/2014 | Tajiri | G03B 21/28 353/38 |
| 2014/0369023 | A1 | 12/2014 | Rehn | |

FOREIGN PATENT DOCUMENTS

| | | | |
|---|---|---|---|
| DE | 102011085978 A1 | 5/2013 | |
| JP | 2001166286 A * | 6/2001 | |
| WO | WO 2013047542 A1 * | 4/2013 | ........... H04N 9/3111 |
| WO | 2013068168 A1 | 5/2013 | |

\* cited by examiner

LIGHTING DEVICE FOR GENERATING LIGHT BY MEANS OF WAVELENGTH CONVERSION

CROSS-REFERENCE TO RELATED APPLICATION

This application claims priority to German Patent Application Serial No. 10 2013 224 691.9, which was filed Dec. 2, 2013, and is incorporated herein by reference in its entirety.

TECHNICAL FIELD

Various embodiments relate generally to a lighting device including an excitation radiation source and a wavelength conversion arrangement for converting excitation radiation into conversion light by means of wavelength conversion.

BACKGROUND

Such a lighting device can be used, for example, as a light-generating unit in a projector, e.g. for video projectors or data projectors, but also for headlight applications in the automotive sector and for lighting equipment in the entertainment, architecture and general lighting sectors.

The document DE 10 2010 001 945 A1 discloses a lighting device for generating light by means of a wavelength conversion arrangement for a projector.

The document DE 10 2011 085 978 A1 discloses optical arrangements for the excitation of phosphors by means of excitation radiation. The excitation radiation is supplied by a laser array.

What is disadvantageous is that part of the excitation radiation is scattered or reflected back from the surface of the irradiated phosphor without being converted and no longer contributes to the wavelength conversion. The efficiency of the wavelength conversion decreases as a result.

SUMMARY

A lighting device includes at least one excitation radiation source designed to emit excitation radiation; a wavelength conversion arrangement, which is arranged in such a way that excitation radiation can be radiated onto a wavelength conversion element. The wavelength conversion element is designed to convert excitation radiation into conversion light. An unavoidable non-converted part of the excitation radiation is reflected by the wavelength conversion element. The device further includes a unit for collimating the excitation radiation to form at least one collimated excitation beam; a unit for directing the at least one collimated excitation beam onto the at least one wavelength conversion element; a unit, which is arranged between collimation optical unit and converging optical unit and has at least one region for reflecting that part of the at least one excitation beam which is not converted, but rather is reflected by the at least one wavelength conversion element.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

Various embodiments may improve the wavelength conversion efficiency of a generic lighting device.

Figure 1:
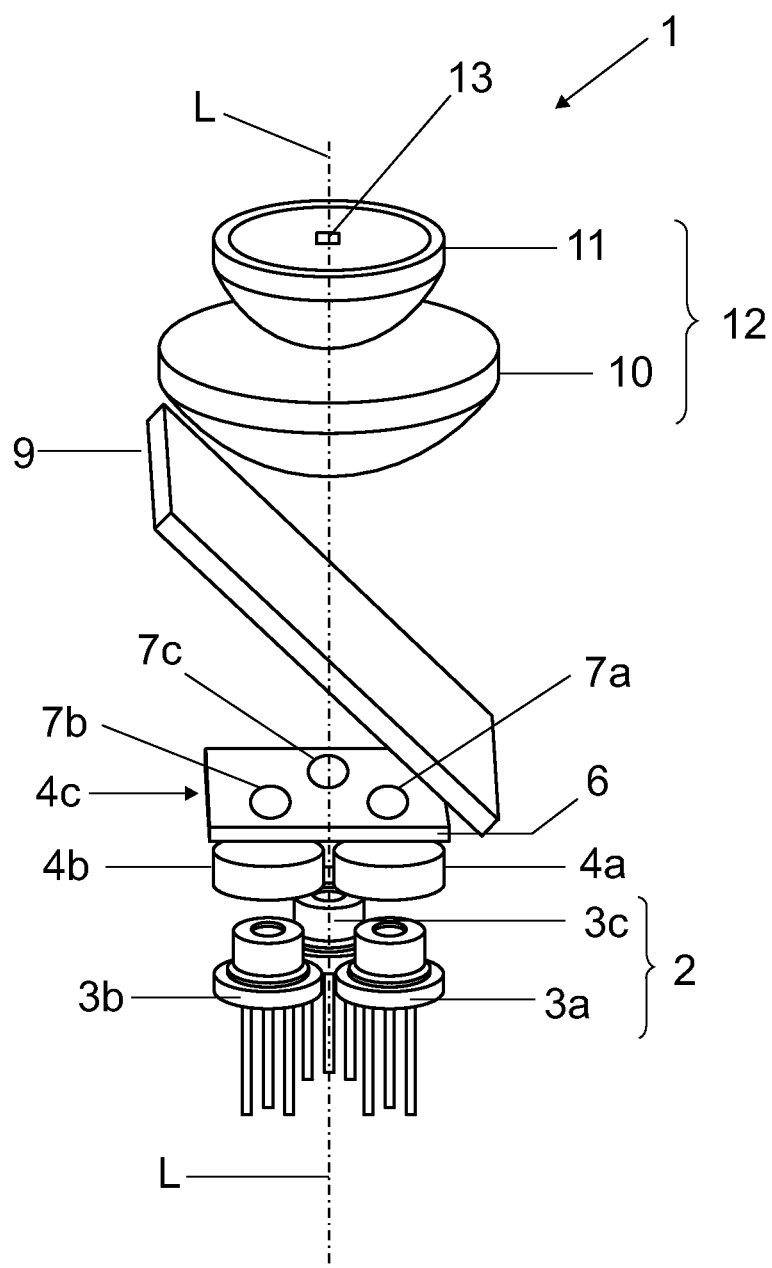
FIG. 1 shows an embodiment of a lighting device.

FIG. 1 shows a schematic spatial illustration of an embodiment of a lighting device 1, said lighting device being suitable for example for use in a video projector. The excitation radiation is supplied by a excitation radiation source 2, which is embodied as a laser diode array and which includes a respective laser diode 3a, 3b and 3c arranged at each corner point of an imaginary triangle. The respective laser wavelength of said laser diode can be designed to be identical or different, in principle, depending on the requirement. The laser diodes 3a, 3b and 3c preferably emit in the blue or ultraviolet spectral range, e.g. in the range of 440-470 nm, e.g. at approximately 450 nm, since this constitutes a suitable excitation wavelength for most phosphors and, in addition, can also be used as a blue color channel if required. Each laser diode 3a, 3b and 3c is assigned a collimation lens 4a, 4b, 4c disposed downstream (the collimation lens 4c cannot be discerned in FIG. 1), which respectively shapes the laser radiation into a collimated excitation beam (for the sake of better clarity, the excitation and conversion beams are not depicted in FIG. 1; in this respect, reference is made to FIG. 4, which schematically illustrates by way of example the simplified beam path for a single laser diode). A mirror optical unit 6 embodied as an optically coated diffuser plate then follows.

Figure 2:
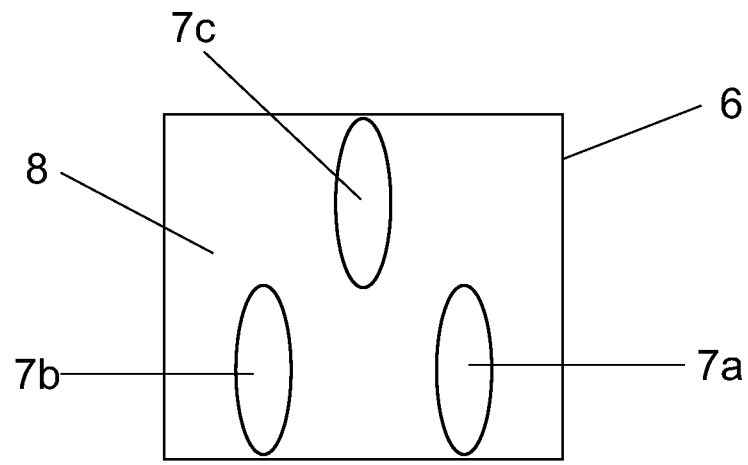
FIG. 2 shows the mirror optical unit with transmissive regions that is used in FIG. 1.

Hereinafter, reference will now also be made to FIG. 2, which shows the rear side of the mirror optical unit 6 facing away from the laser diodes. The mirror optical unit 6 consists of a diffusely scattering material that is transmissive to the blue laser radiation, for example borosilicate glass chemically etched at the surface. Moreover, the mirror optical unit 6 includes a transmission region composed of three separate elliptical partial regions 7a, 7b and 7c, said transmission region being transparent to the laser radiation. Each partial region 7a, 7b and 7c is spatially assigned to a collimated excitation beam (not illustrated in FIG. 1 and FIG. 2), i.e. the three collimated excitation beams can transmit through the mirror optical unit 6 in an unimpeded manner. For this purpose, in a manner corresponding to the arrangement of the three laser diodes 4a, 4b, 4c, the three transparent partial regions 7a, 7b, 7c are likewise arranged at the corner points of the same imaginary triangle. With the exception of the three transparent partial regions 7a, 7b, 7c, the surface of the rear side of the optical element 6 is provided with a coating that is reflective for the blue laser radiation, and thus forms a second region 8 that is reflective for the laser radiation.

The three collimated excitation beams transmit through the assigned transparent partial regions 7a, 7b, 7c of the mirror optical unit 6 and then through a dichroic mirror 9. The three collimated excitation beams are then focused onto a lamina 13, which is coated with a phosphor, by means of a converging optical unit 12 consisting of two lenses 10, 11. The excitation beams are largely subjected to wavelength conversion by the phosphor lamina 13 and the conversion light 14 is specularly reflected out of the laser beam path by means of the dichroic mirror 9 tilted 45° with respect to the optical axis L. An unconverted part of each of the three collimated excitation beams is reflected by the phosphor lamina 13 and passes, by means of the converging optical unit, as three collimated return excitation beams (not illustrated in FIG. 1 and FIG. 2) through the dichroic mirror 9 back to the rear side of the mirror optical unit 6.

Figure 3:
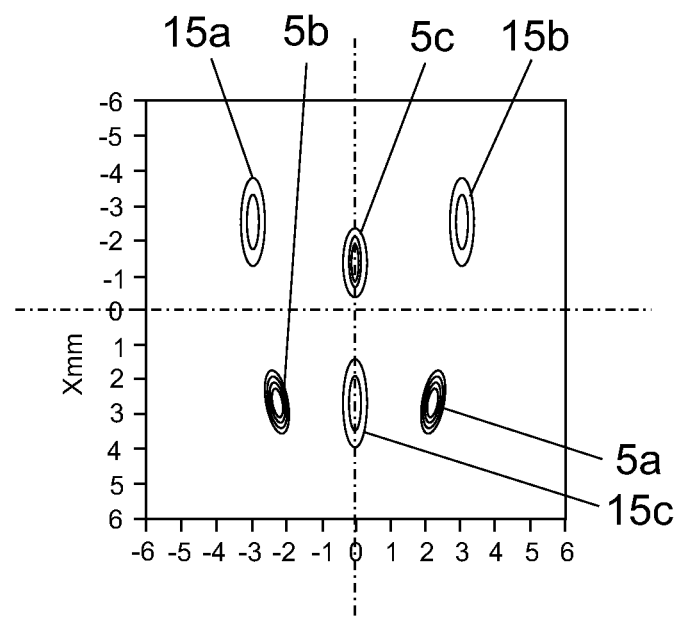
FIG. 3 shows a mapping of the excitation and return excitation beams.

Hereinafter, reference will now also be made to FIG. 3, which shows in the plane of the rear side of the mirror optical unit 6 the laser spots of the three excitation beams 5a, 5b, 5c propagating in the direction of the phosphor lamina, and of the return excitation beams 15a, 15b, 15c. Since the collimated excitation beams 5a, 5b, 5c propagate in each case parallel in an offset fashion with respect to the optical axis L, after the partial reflection at the phosphor lamina 13 they pass as return excitation beams 15a, 15b, 15c likewise parallel in an offset fashion back to the partly reflectively coated rear side of the mirror optical unit 6. The return excitation beams 15a, 15b, 15c impinge there on the reflective region 8 of the mirror optical unit 6 outside the transmissive partial regions 7a, 7b, 7c. From the reflective region 8, the return excitation beams 15a, 15b, 15c are reflected back again to the phosphor lamina 13, where they again have a chance at wavelength conversion.

Figure 4:
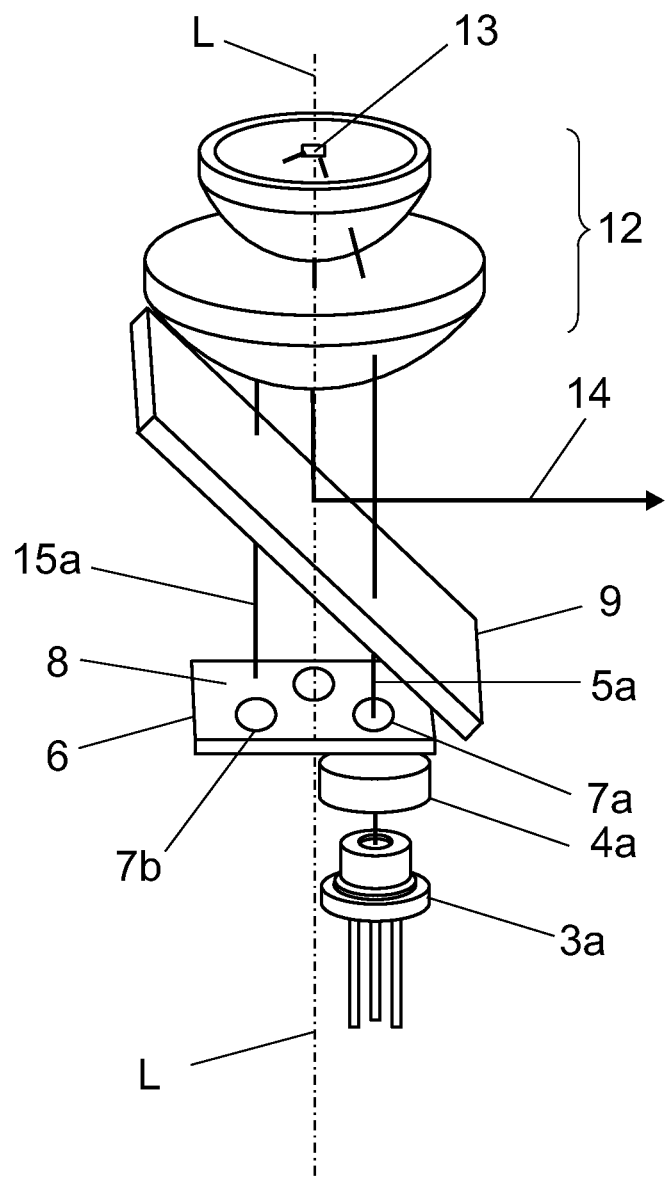
FIG. 4 shows the greatly simplified beam path for the embodiment from FIG. 1 on the basis of the example with only one laser diode.

This sequence is illustrated roughly schematically in FIG. 4, for only a single collimated excitation beam 5a for the sake of better clarity. The excitation beam 5a emitted by the laser diode 3a, transmitted through the associated transmission region 7a and collimated by means of the collimation lens 4a is symbolized here. The laser diode 3a is arranged parallel in an offset fashion with respect to the optical axis of the converging optical unit 12 (the other two laser diodes, associated collimation lenses and laser beams, cf. FIG. 1, are not depicted here, for the sake of better discernability). The collimated excitation beam 5a thus likewise passes parallel in an offset fashion with respect to the optical axis L of the converging optical unit 12 onto the latter and is directed onto the phosphor lamina 13 by said converging optical unit. The unconverted part of the excitation beam 5a is reflected by the phosphor lamina 13 and collimated into a return excitation beam 15a by means of the converging optical unit 12. Said return excitation beam passes on the same light path as the image of the excitation beam 5a mirrored on the optical axis L, although in the opposite direction, that is to say back in the direction of the mirror optical unit 6. The collimated return excitation beam 15a impinges there on the reflection region 8, i.e. on the reflectively coated region of the rear side of the mirror optical unit 6. Since the rear side of the mirror optical unit 6 is oriented perpendicularly to the optical axis L of the converging optical unit 12, the return excitation beam 15a is reflected back on itself by the reflectively coated region and is reflected again onto the phosphor lamina 13. The efficiency improvement for the conversion functions in a corresponding manner for the excitation radiation from the other two laser diodes 3b, 3c.

In various embodiments, a lighting device for generating light by means of a wavelength conversion is provided. The lighting device may include at least one excitation radiation source designed to emit excitation radiation, a wavelength conversion arrangement including at least one wavelength conversion element, which wavelength conversion arrangement is arranged in such a way that excitation radiation emitted by the excitation radiation source can be radiated at least indirectly onto the at least one wavelength conversion element, wherein the at least one wavelength conversion element is designed to convert excitation radiation at least partly into conversion light, and wherein an unavoidable non-converted part of the excitation radiation is reflected by the wavelength conversion element, a collimation optical unit for collimating the excitation radiation to form at least one collimated excitation beam, a converging optical unit for directing the at least one collimated excitation beam onto the at least one wavelength conversion element. The lighting device furthermore includes a mirror optical unit, which is arranged between collimation optical unit and converging optical unit and has at least one region for reflecting that part of the at least one excitation beam which is not converted, but rather is reflected by the at least one wavelength conversion element.

In the context of the present disclosure, the term "collimated beam" is intended also to encompass slightly divergent beams. This slight divergence can also be caused, for example, by virtue of the fact that the beams pass not only through a collimation optical unit but also through an optical diffuser, which brings about a divergence angle of 1 to 2 degrees, for example, on account of the scattering effect. Moreover, the collimation optical unit itself or the optical alignment can bring about a divergence angle of a few degrees.

A concept of the present disclosure may consist in the fact that the scattered excitation radiation which is reflected back or not converted by the phosphor and is collimated by means of the converging optical unit, said radiation hereinafter also being designated as collimated return excitation beam for the sake of simplicity, is used again for the phosphor conversion by virtue of the fact that that (reflected or scattered) part of the excitation radiation which is reflected without being converted by the phosphor is reflected back to the phosphor with the aid of a reflective region of a mirror optical unit.

For this purpose, the mirror optical unit is arranged in the beam path of the at least one return excitation beam. In the case of a plurality of excitation radiation sources, the mirror optical unit may include a plurality of separate mirror elements. Alternatively, a plurality of specularly reflective regions can be integrated on a common mirror optical unit. In this case, the mirror optical unit is designed and arranged such that a mirror element or specularly reflective region is spatially assigned to each return excitation beam. In this way, each return excitation beam coming from the phosphor impinges on a specularly reflective area and is reflected back from the latter to the phosphor.

Besides having at least one region for reflecting the at least one return excitation beam, the mirror optical unit can also additionally have at least one region for transmitting the at least one excitation beam collimated by means of a collimation lens. In various embodiments, the reflection and transmission regions can also be provided on a common mirror optical unit. In the context of this disclosure, the term mirror optical unit can therefore encompass not only a mirror function but also a transmission function, wherein the two different functions are embodied in a spatially separated fashion.

In various embodiments, the mirror optical unit is formed as a plate composed of material that is transmissive to the excitation radiation. That may have the effect that the at least one region for reflection can be formed by a reflective coating on a part of the plate and the at least one region for transmission can be formed from a part of the plate without a reflective coating.

Particularly in the case of a plurality of excitation radiation sources, the mirror optical unit is therefore provided as it were with a pattern of reflective and transmissive regions. The excitation radiation sources are arranged in a pattern in a similar manner. Both patterns are coordinated with one another such that a transmission region is arranged opposite each excitation radiation source. Conversely, no excitation radiation source is provided opposite a reflection region, since the reflection region is not transmissive to the excitation radiation of said source anyway.

Moreover, the plate used for the mirror optical unit can also consist of a diffusely scattering material. That has the advantage that the mirror optical unit can additionally also be used as an optical diffuser for the excitation beams. A diffuser counteracts local power density spikes on the phosphor which might damage or even permanently destroy the phosphor.

Alternatively, the transmission regions of the mirror optical unit can also be embodied as through openings. That may have the effect that, in this case, the mirror optical unit need not consist of a material that is transparent to the excitation radiation, but rather can be produced from metal, for example.

In various embodiments, the wavelength conversion arrangement is arranged such that the at least one wavelength conversion element is arranged at least approximately at the focal point of the converging optical unit. That may have the effect that that part of the at least one excitation beam which is reflected by the wavelength conversion element is collimated by said converging optical unit to form a return excitation beam. The return excitation beam thus collimated forms a correspondingly delimited beam spot on the reflection region of the mirror optical unit. Moreover, the conversion light generated in proximity to the focus can be efficiently collected and collimated by means of the converging lens. The collimated conversion light can be separated from the excitation radiation for example with the aid of a dichroic mirror element arranged between the wavelength conversion arrangement and the at least one excitation radiation source.

In various embodiments, the at least one excitation radiation source and the collimation optical unit are designed and arranged in such a way that the at least one collimated excitation beam runs parallel in an offset fashion with respect to the optical axis of the converging optical unit. That may have the effect that the associated return excitation beam likewise returns parallel in an offset fashion, to be precise in a mirror-inverted manner relative to the optical axis of the converging optical unit. Consequently, the return excitation beam impinges on the mirror optical unit in a manner corresponding offset with respect to the associated excitation beam. Given a sufficient offset of the at least one excitation radiation source with respect to the optical axis of the converging optical unit, the transmissive and reflective regions for the at least one excitation and return excitation beam on the mirror optical unit can be spatially separated well.

In the case of a plurality of excitation radiation sources, the individual excitation radiation sources may be arranged such that no excitation radiation sources are spatially assigned to the reflection regions. Rather, the excitation radiation sources may be arranged exclusively such that their excitation radiation can pass through the transmission regions. In various embodiments, as a result, moreover, each collimated excitation beam is transmitted by an assigned transmission region and each collimated return excitation beam is reflected by a reflection region.

Moreover, the at least one region for reflection is e.g. oriented at least approximately perpendicularly to the optical axis of the converging optical unit. That may have the effect that the return excitation beam is specularly reflected back on itself by the mirror optical unit and is directed back onto the original location of the phosphor layer.

The wavelength conversion arrangement may be embodied as a phosphor element arranged in a static fashion, i.e. the phosphor does not move or at least does not move permanently during the conversion. Alternatively, the wavelength conversion arrangement may for example also be embodied as a phosphor wheel that is rotatable about a rotation axis. The at least one phosphor then rotates on a disk-shaped carrier, for example in the form of a ring-shaped segment, through the excitation beams.

Various embodiments have been explained above on the basis of the example of a wavelength conversion arrangement embodied as a phosphor lamina arranged in a static fashion. Various embodiments nevertheless manifests its effect in the case of a generic lighting device, too, in which the wavelength conversion arrangement is embodied in the form of a phosphor wheel or in some other way.

In order to increase the efficiency of the wavelength conversion of a lighting device, various embodiments propose that that part of the excitation radiation which is reflected without being converted by a phosphor is reflected back to the phosphor with the aid of a reflective region of a mirror optical unit and is thus used again for the wavelength conversion. The excitation radiation coming from laser diodes can pass through corresponding transmission regions of the mirror optical unit onto the phosphor.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A lighting device for generating light by means of a wavelength conversion, the lighting device comprising:
    three excitation radiation sources designed to emit excitation radiation, wherein the three excitation radiation sources are arranged in a triangle, in a parallel and offset fashion with respect to an optical axis of a converging optical unit;

a wavelength conversion arrangement comprising at least one wavelength conversion element, which wavelength conversion arrangement is arranged in such a way that excitation radiation emitted by the excitation radiation source can be radiated at least indirectly onto the at least one wavelength conversion element, wherein the at least one wavelength conversion element is designed to convert excitation radiation at least partly into conversion light, and wherein an unavoidable non-converted part of the excitation radiation is reflected by the wavelength conversion element;

a collimation optical unit for collimating the excitation radiation to form at least one collimated excitation beam;

the converging optical unit for directing the at least one collimated excitation beam onto the at least one wavelength conversion element;

a mirror optical unit, which is arranged between collimation optical unit and converging optical unit wherein the mirror optical unit comprises a plate composed of material that is transmissive to the excitation radiation;

wherein the mirror optical unit has three regions for transmitting the collimated excitation beam the three regions for transmitting being arranged in a triangle, in a parallel and offset fashion with respect to the optical axis of the converging optical unit, and corresponding to the triangular arrangement of the three excitation radiation sources;

wherein the mirror optical unit has three regions for reflecting that part of the at least one excitation beam which is not converted, but rather is reflected by the at least one wavelength conversion element, the three regions for reflecting being arranged in a triangle in a parallel and offset fashion with respect to the optical axis of the converging optical unit, wherein the triangular arrangements of the three regions for transmitting and the three regions for reflecting are inverted with respect to one another and together form two rows of alternating transmitting and reflecting regions;

wherein the at least one region for reflecting and the at least one region for transmitting are formed by a reflective layer on a part of the mirror optical unit and a part of the mirror optical unit without a reflective layer, respectively.

2. The lighting device of claim 1,
wherein the at least one excitation radiation source and the collimation optical unit are designed and arranged in such a way that the at least one collimated excitation beam runs parallel in an offset fashion with respect to the optical axis of the converging optical unit.

3. The lighting device of claim 1,
wherein the mirror optical unit comprises a plate composed of material that is nontransmissive to the excitation radiation, and wherein the at least one region for transmission is formed by a through opening in the material.

4. The lighting device of claim 1,
wherein the at least one region for reflection is oriented perpendicularly to the optical axis of the converging optical unit.

5. The lighting device of claim 1,
further comprising the mirror optical unit being a combined diffuser and reflector, wherein a light diffusive material is at least partially configured with a reflective coating, and wherein the mirror optical unit's at least one region for transmitting the collimated excitation beam is embodied as a diffuser, configured to diffuse the collimated excitation radiation before the collimated excitation radiation passes through the converging optical unit.

6. The lighting device of claim 1, further comprising:
a plurality of excitation radiation sources, wherein the collimation optical unit consists of a plurality of individual collimation lenses; and
wherein each excitation radiation source is assigned a collimation lens for generating a respective collimated excitation beam.

7. The lighting device of claim 6,
wherein the individual excitation radiation sources are arranged such that no excitation radiation sources are assigned to the at least one region for reflection.

8. The lighting device of claim 6,
wherein the converging optical unit collimates that part of the at least one excitation beam which is reflected by the at least one wavelength conversion element to form a respective return excitation beam;
wherein the at least one region for reflection and the at least one region for transmission are arranged on the mirror optical unit such that each collimated excitation beam is transmitted by an assigned region for transmission and each collimated return excitation beam is reflected by a region for reflection.

9. The lighting device of claim 1, further comprising:
a dichroic mirror element between the wavelength conversion arrangement and the at least one excitation radiation source for separating excitation radiation and conversion light.

10. The lighting device of claim 1,
wherein the at least one wavelength conversion element is arranged at least in proximity to the focal point of the converging optical unit.

11. The lighting device of claim 10,
wherein the converging optical unit collimates that part of the at least one excitation beam which is reflected by the at least one wavelength conversion element to form a respective return excitation beam.

12. The lighting device of claim 1,
wherein the wavelength conversion arrangement is embodied as a phosphor wheel, which is rotatable about a rotation axis of the phosphor wheel;
wherein the at least one wavelength conversion element is ring-shaped and extends around the rotation axis of the phosphor wheel.

13. The lighting device of claim 1,
being configured as a projector.

14. The lighting device of claim 1, further comprising the mirror optical plate comprising chemically etched glass.

15. The lighting device of claim 14, further comprising the chemically etched glass being borosilicate glass.

16. The lighting device of claim 1, further comprising at least one region of the mirror optical unit for transmitting the collimated excitation beam being a diffuser comprising chemically etched glass.

17. The lighting device of claim 1, wherein each of the three light transmissive regions is shaped as an ellipse.

* * * * *